(12) United States Patent
Kundarewich et al.

(10) Patent No.: US 11,003,827 B1
(45) Date of Patent: May 11, 2021

(54) MULTIPROCESSING FLOW AND MASSIVELY MULTI-THREADED FLOW FOR MULTI-DIE DEVICES

(71) Applicant: XILINX, INC., San Jose, CA (US)

(72) Inventors: Paul D. Kundarewich, Toronto (CA); Grigor S. Gasparyan, San Jose, CA (US); Mehrdad Eslami Dehkordi, Los Gatos, CA (US); Guenter Stenz, Niwot, CO (US); Zhaoxuan Shen, San Jose, CA (US); Amish Pandya, Fremont, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/796,855

(22) Filed: Feb. 20, 2020

(51) Int. Cl.
*G06F 30/392* (2020.01)
*G06F 111/04* (2020.01)

(52) U.S. Cl.
CPC ........ *G06F 30/392* (2020.01); *G06F 2111/04* (2020.01)

(58) Field of Classification Search
CPC ........................... G06F 30/392; G06F 2111/04
USPC ......................................................... 716/124
See application file for complete search history.

(56) References Cited

U.S. PATENT DOCUMENTS

| | | | | |
|---|---|---|---|---|
| 8,032,772 B2 * | 10/2011 | Allarey | .................. | G06F 1/324 713/322 |
| 8,250,513 B1 * | 8/2012 | Verma | .................. | G06F 30/394 716/126 |
| 8,418,115 B1 * | 4/2013 | Tom | ...................... | G06F 30/392 716/131 |
| 8,473,881 B1 * | 6/2013 | Fang | ..................... | G06F 30/331 716/105 |
| 9,529,957 B1 * | 12/2016 | Gasparyan | ........... | G06F 30/392 |
| 9,594,859 B1 * | 3/2017 | Padalia | .................. | G06F 30/392 |
| 10,108,773 B1 * | 10/2018 | Gasparyan | ........... | G06F 30/392 |
| 10,496,777 B1 * | 12/2019 | Venkatakrishnan | ........ | G06F 30/3312 |
| 10,558,777 B1 * | 2/2020 | Yu | .......................... | G06F 30/34 |
| 10,572,621 B1 * | 2/2020 | Wang | .................... | G06F 30/327 |
| 2010/0023903 A1 * | 1/2010 | Pramono | .............. | G06F 30/367 716/106 |
| 2013/0069163 A1 * | 3/2013 | Bhalla | ................. | H01L 23/3171 257/368 |
| 2015/0135147 A1 * | 5/2015 | Emirian | ............... | G06F 30/398 716/105 |

(Continued)

*Primary Examiner* — Suresh Memula
(74) *Attorney, Agent, or Firm* — Patterson + Sheridan, LLP (57) ABSTRACT

Examples described herein provide a non-transitory computer-readable medium storing instructions, which when executed by one or more processors, cause the one or more processors to perform operations. The operations include: generating, using the one or more processors, a plurality of child processes according to a number of programmable dies of the multi-die device, each of the plurality of child processes corresponding to a respective programmable die of the multi-die device, wherein the plurality of child processes execute on different processors; partitioning a design for the multi-die device into a plurality of portions, each of the portions to be used to configure one of the programmable dies of the multi-die device; transmitting the plurality of portions of the design to the plurality of child processes for placement; and receiving placements from the plurality of child processes.

20 Claims, 10 Drawing Sheets

(56) References Cited

U.S. PATENT DOCUMENTS

2018/0341738 A1\* 11/2018 Kahng .................... G06F 30/39
2019/0303523 A1\* 10/2019 Xu ...................... H01L 27/0207

\* cited by examiner

MULTIPROCESSING FLOW AND MASSIVELY MULTI-THREADED FLOW FOR MULTI-DIE DEVICES

TECHNICAL FIELD

Examples of the present disclosure generally relate to electronic circuit design and, in particular, to multi-processing and massive multi-threading flow used for circuit design.

BACKGROUND

A programmable integrated circuit (IC) refers to a type of IC that includes programmable circuitry. An example of a programmable IC is a field programmable gate array (FPGA). An FPGA is characterized by the inclusion of programmable circuit blocks. Circuit designs may be physically implemented within the programmable circuitry of a programmable IC by loading configuration data, sometimes referred to as a configuration bitstream, into the device. The configuration data may be loaded into internal configuration memory cells of the device. The collective states of the individual configuration memory cells determine the functionality of the programmable IC. For example, the particular operations performed by the various programmable circuit blocks and the connectivity between the programmable circuit blocks of the programmable IC are defined by the collective states of the configuration memory cells once loaded with the configuration data.

Generally, placement and routing algorithms targeting FPGAs do not use multiple processors or massive multi-threading and thus did not save as much runtime as they could have. Even when multiple processors or massive multi-threading were used, they were used to speed up a specific algorithm and not applicable across the entire placement flow. Moreover, these algorithms suffered from quality of results (QoR) loss (e.g., failure to meet timing constraints). QoR is defined here as whether the multi-die device has met timing constraints and maximum frequency of operations. The QoR loss resulted from the algorithms not being able to optimize critical paths across die boundaries or the algorithms suffering from a lack of runtime as a number of placement algorithms did not scale well beyond four to eight threads (e.g., because of bottlenecking in shared resources).

SUMMARY

Examples of the present disclosure generally relate to configuring devices with multiple dies in an effort to improve QoR and to improve runtime of placement algorithms.

One example of the present disclosure is a method for configuring a multi-die device using a multi-processing flow (MPF). The method generally includes: generating, using one or more processors, a plurality of child processes according to a number of programmable dies of the multi-die device, each of the plurality of child processes corresponding to a respective programmable die of the multi-die device, wherein the plurality of child processes execute on different processors; partitioning a design for the multi-die device into a plurality of portions, each of the portions to be used to configure one of the programmable dies of the multi-die device; transmitting the plurality of portions of the design to the plurality of child processes for placement; and receiving placements from the plurality of child processes.

Another example of the present disclosure is a method for configuring a multi-die device using a massively multi-thread (MMT) flow. The method generally includes: partitioning a design for the multi-die device into a plurality of portions, each of the plurality of portions to be placed on a respective programmable die of the multi-die device; generating a plurality of thread pools according to a number of programmable dies of the multi-die device, each of the plurality of thread pools corresponding to a programmable die of the multi-die device; generating a context for each of the programmable dies of the multi-die device by isolating a plurality of data structures of each programmable die; and generating a placement for each programmable die of the multi-die with the context using a respective thread pool of the plurality of thread pools.

Aspects of the present disclosure also provide apparatus, methods, processing systems, and computer readable mediums for performing the operations described above.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples described herein describe a multi-processing flow (MPF) and a massively multi-thread (MMT) flow for configuring and placing circuit designs on multi-die devices. One example of MPF involves partitioning a circuit design to be configured and placed on a multi-die device by splitting the circuit design into multiple circuit design portions and placing each circuit design portion on each programmable die of the multi-die device using multiple processors. By placing each circuit design portion separately, the multiple processors limit interactions with other circuit design portions, which means that the circuit design portions are smaller to place. One example of MMT flow involves partitioning the circuit design into circuit design portions to be placed on the multi-die device by thread pools of a processor, and in this example, contexts are generated for each of the circuit design portions. The context of each circuit design portion can include data structures isolated from the contexts of the other circuit design portions, such that the contexts are independent from each other. By having an independent context for each programmable die, the thread pools can independently place each circuit design portion on each programmable die of the multi-die device.

Accordingly, by subdividing the circuit design into multiple circuit design portions, MPF and MMT flows allow for parallel placement without suffering from QoR loss or lack of thread scaling. Furthermore, placement is performed on a per-die basis, which saves placement runtime, because placement per-die is done in parallel.

In some examples, routing problems (e.g., routing congestion) tend to manifest along the boundaries and corners of the programmable dies of multi-die devices, due to the reduction of adjacent routing resources. This may result in a circuit design failing to route certain nets and/or failing to meet timing requirements. Furthermore, certain components need to be placed next to one another to avoid penalty. Accordingly, MPF and MMT flows are configured to partition the circuit design along the boundaries and corners of the dies of the multi-die device to reduce the number of nets crossing the die boundaries and to make those nets that do cross the boundaries non-timing critical. Because MPF and MMT flows involve avoiding nets that cross die boundaries so that nets are less likely to be critical nets (and thus QoR does not suffer), splitting the circuit design into smaller circuit design portions can make placement of the circuit design portions faster to solve without causing degradation in the quality of the solution.

Additionally, devices with multiple dies often have a limited number of crossings across the dies, and this limited number of crossings provide a natural way of partitioning the circuit design on the devices. MPF and MMT flows save runtime by taking advantage of this natural partition to allow parallelism without suffering from QoR loss or lack of thread scaling. Prior attempts at multi-threading or multi-processing attempted to speed up a specific algorithm, not the entire placement flow. Thus, MPF and MMT flows also save runtime by implementing multi-processing and multi-threading across the entire placement flow. The terms "mapping" and "placement" are used herein interchangeably.

Figure 4:
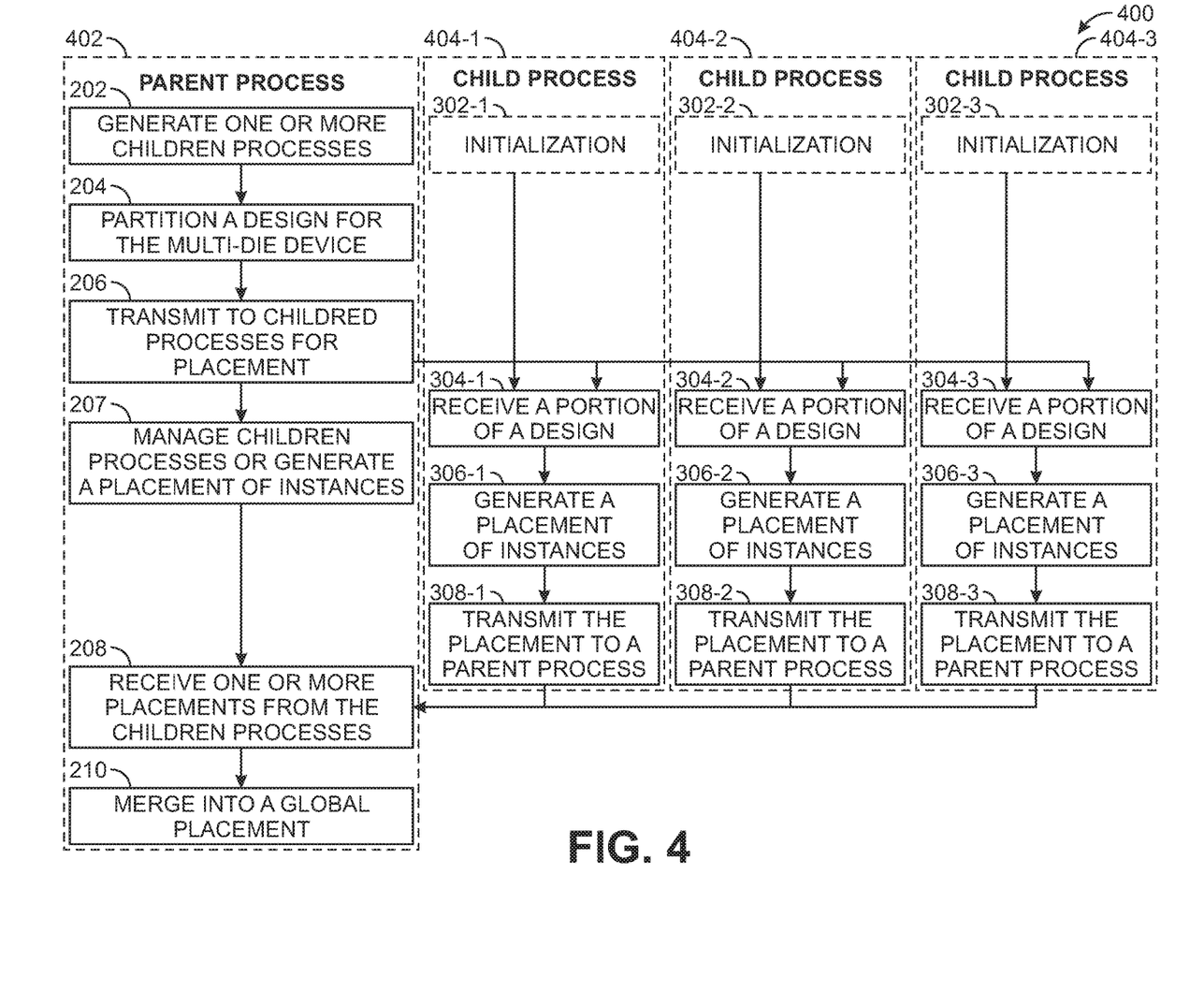
FIG. 4 illustrates an example flow of a parent process and child process in a multi-processing flow, according to an example.
Figure 5A:
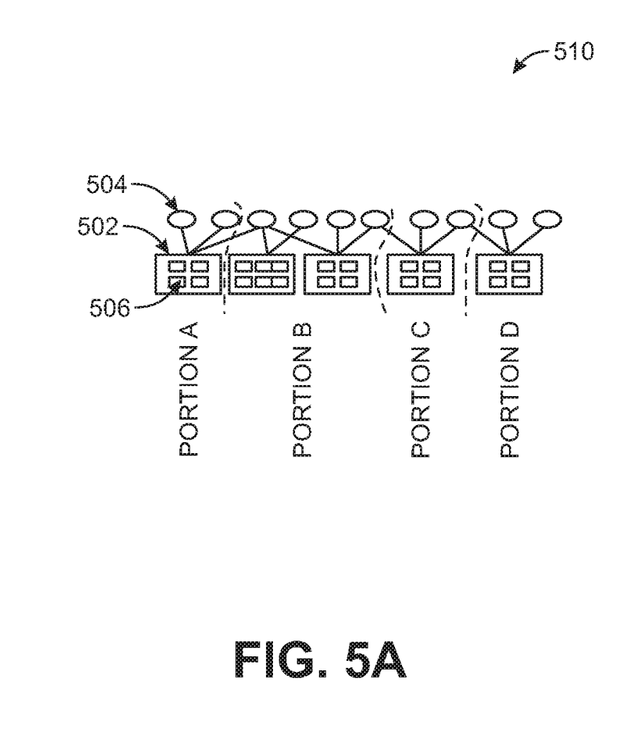
FIGS. 5A and 5B illustrate example floorplanning and placement for a multi-processing flow.
Figure 5B:
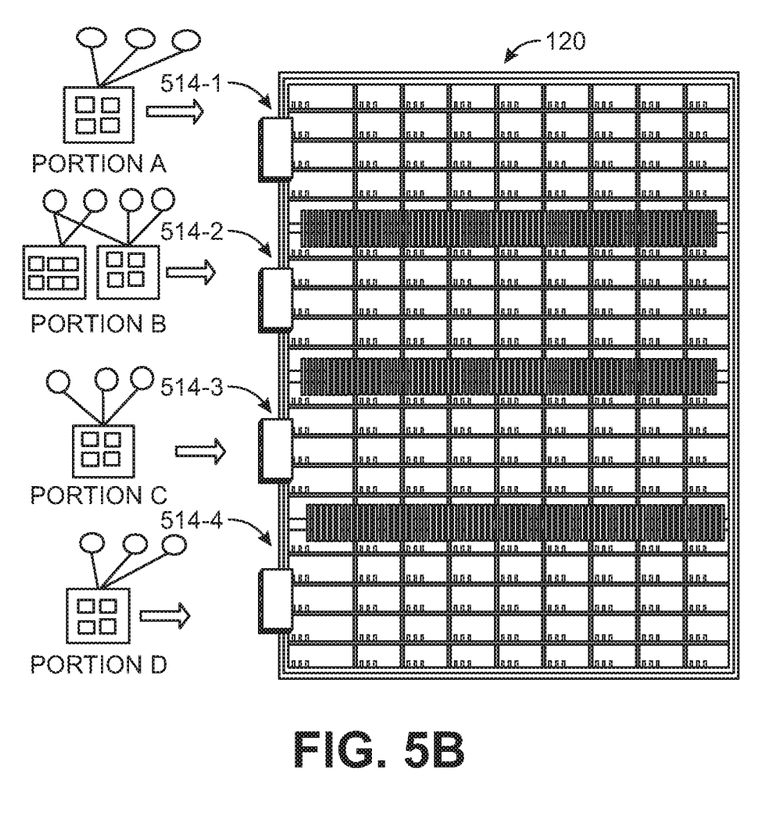
Figure 6:
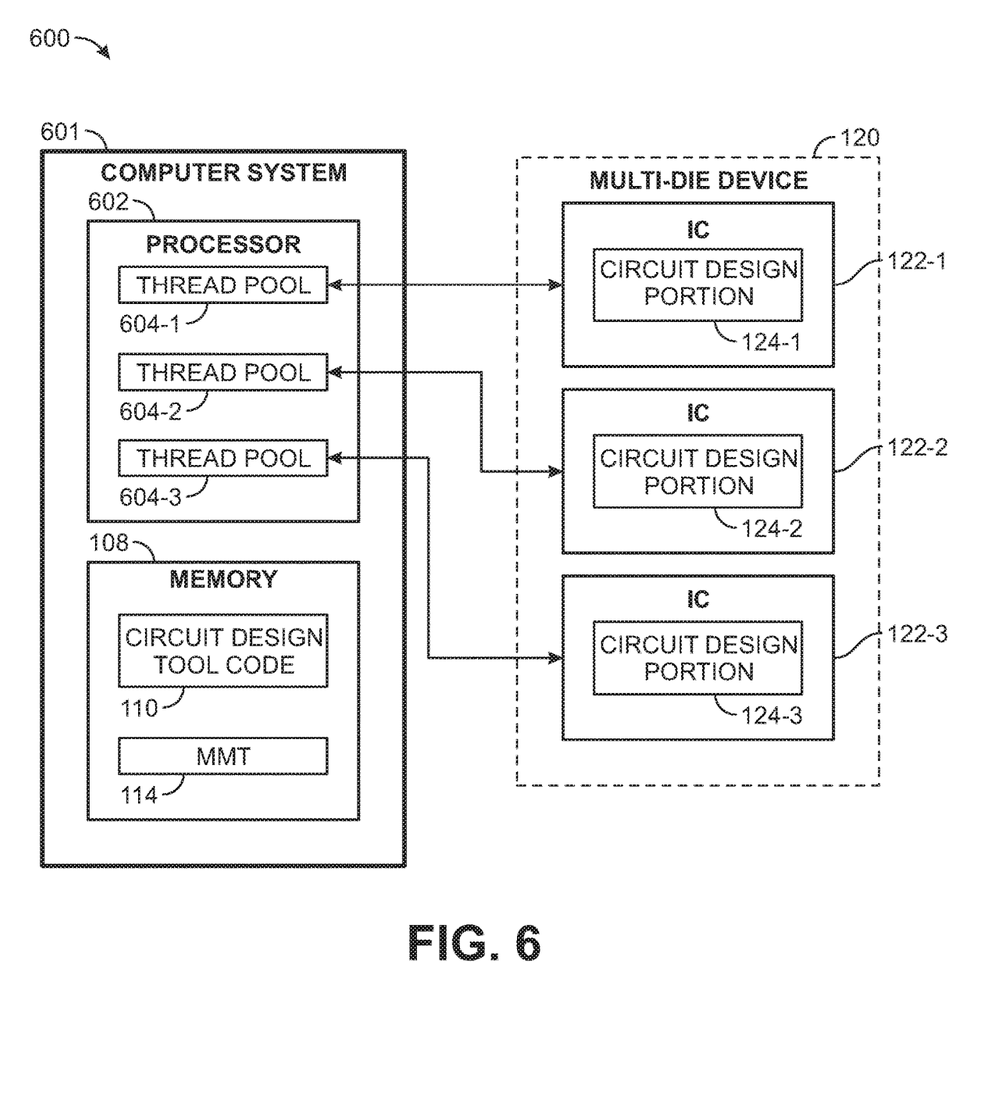
FIG. 6 depicts an example of a circuit design system using a massively multi-threaded flow.
Figure 7:
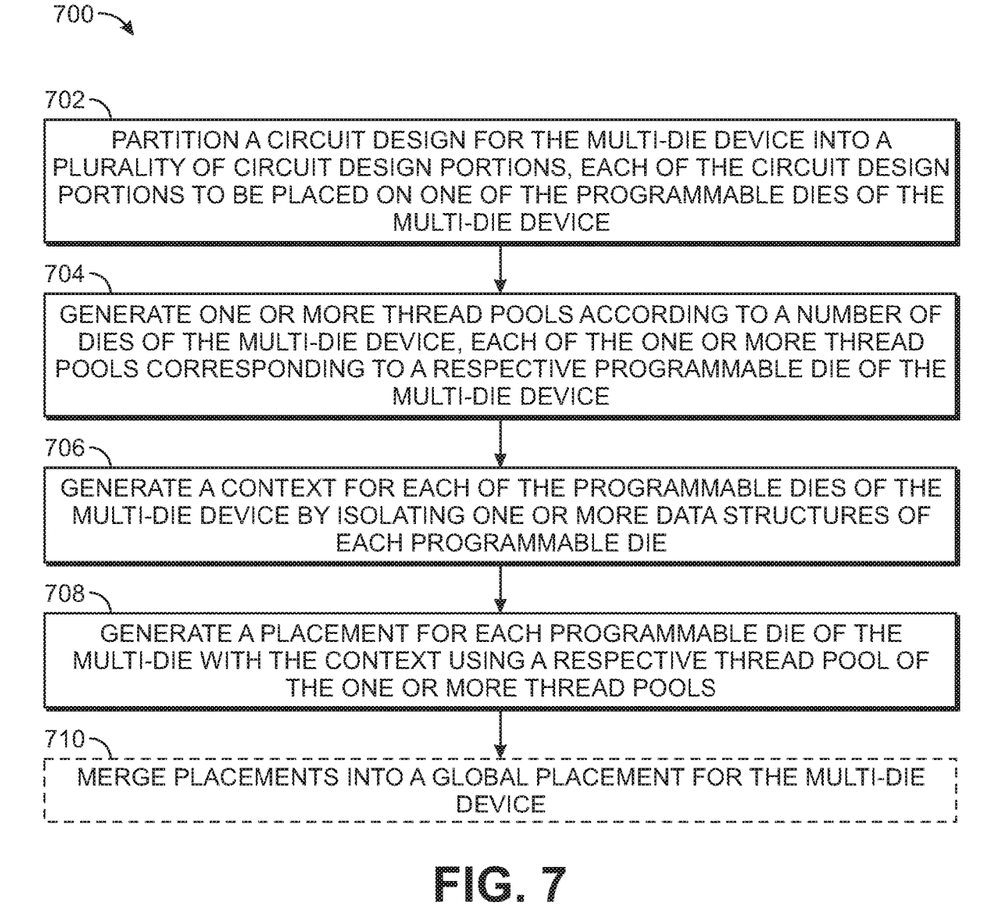
FIG. 7 is a flow diagram illustrating massively a massively multi-threaded flow for placing a circuit design on a multi-die device, according to an example.
Figure 8:
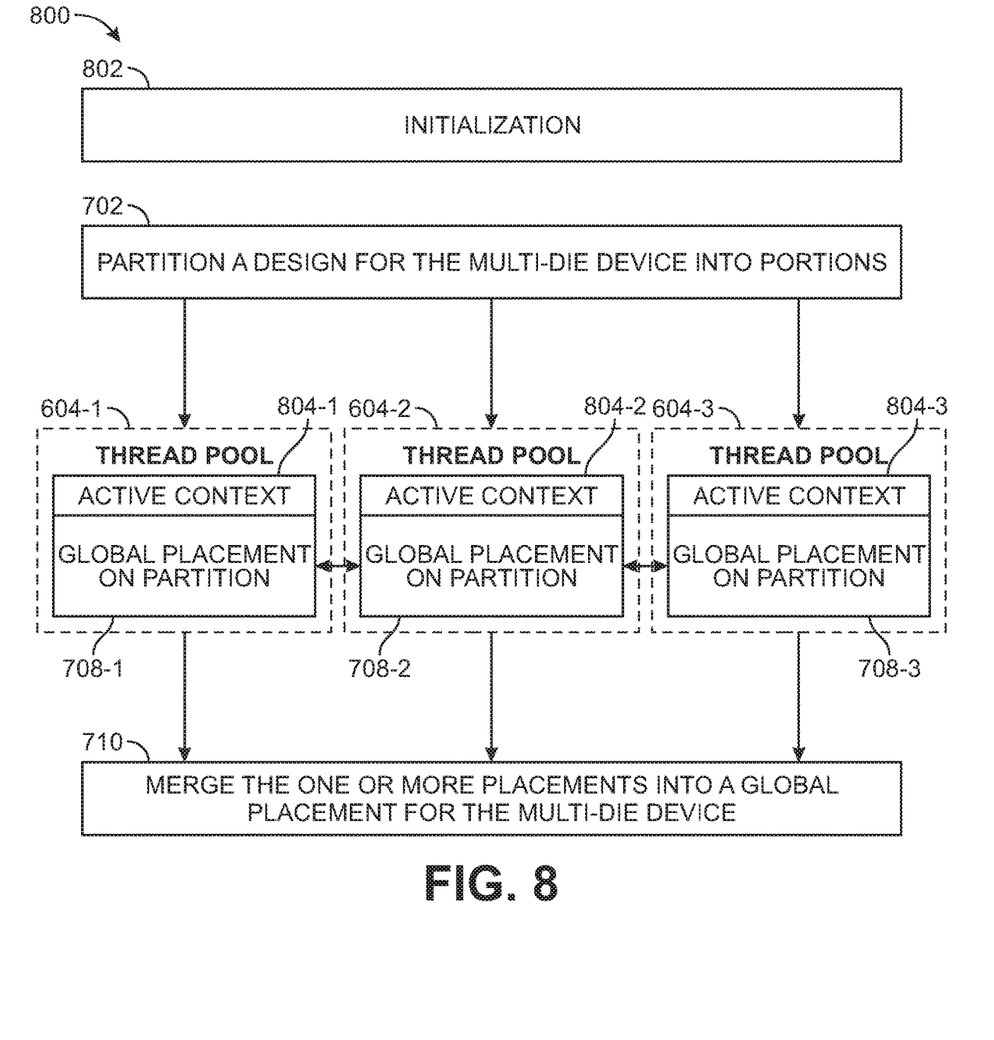
FIG. 8 illustrates an example flow using a massively multi-threaded flow, according to an example.

Generally, FIGS. 1-5 disclose various embodiments related to MPF while FIGS. 6-8 disclose various embodiments related to MMT.

Figure 1A:
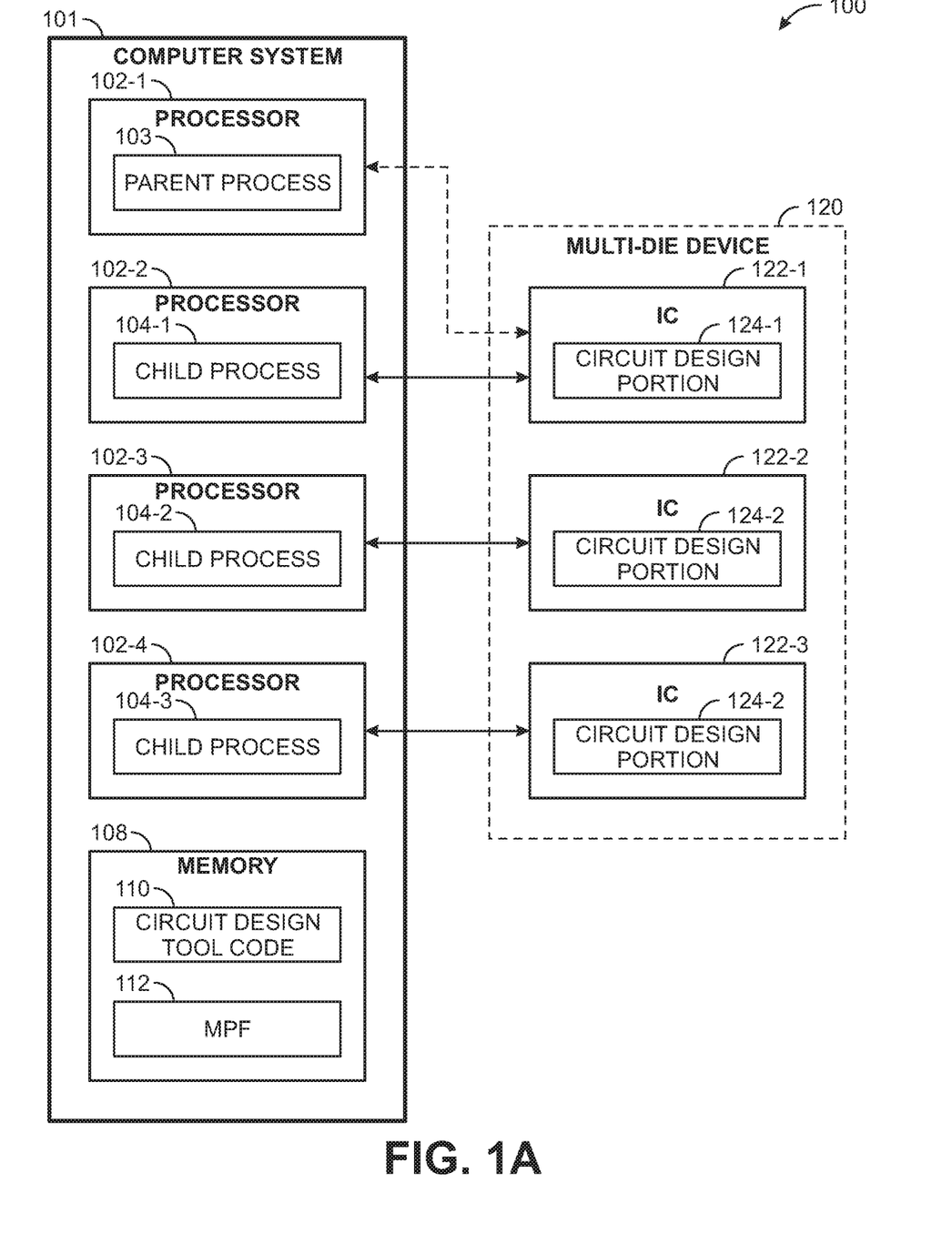
FIG. 1A depicts an example of a circuit design system using a multi-processing flow.

FIG. 1A is a block diagram depicting an example of a circuit design system 100 using MPF. The circuit design system 100 includes a computer 101 coupled to a multi-die device 120. The computer 101 includes multiple processors 102-1, 102-2, 102-3, 102-4 (collectively "processors 102"), and a memory 108. One of the processors 102 executes a parent process 103 while the other three processors 102 execute child processes 104-1, 104-2, 104-3 (collectively "child processes 104"). Any of the processors 102 can execute the parent process 103 or the child processes 104. Because each of the child process can perform the same operations, reference to a single child process can apply any other child processes 104.

The IC dies 122-1, 122-2, 122-3 (collectively "IC dies 122") can be IC dies of the multi-die device 120. The IC dies 122 can be referred herein as IC dies. In some examples, the IC dies 122 of the multi-die device 120 are vertically stacked and disposed on a carrier. The IC die 122-1 is the top IC die or top-most IC die, and the IC die 122-3 is the bottom IC die or the bottom-most IC die. In general, the top-most IC die is the IC die that is farthest from the carrier and has an exposed backside. The bottom-most IC die is the IC die that is the closest to the carrier (e.g., mounted on the carrier). The carrier can be a circuit board, interposer, or the like. Each of the IC die 122 is an active IC. An "active IC" is an IC that includes active circuitry (e.g., transistors), as opposed to a passive IC, such as an interposer, that includes only conductive interconnect. Each of the IC dies 122 can be a mask-programmed IC, such as an application specific integrated circuit (ASIC), or an IC, such as a FPGA. The multi-die device 120 can include all masked-programmed ICs, all programmable ICs, or a combination of both mask-programmed ICs and programmable ICs. While the multi-die device 120 is shown as having three IC die, in general the multi-die device 120 can include two or more IC dies. The terms "programmable die" and "IC die" are used herein interchangeably.

A user interacts with the circuit design system 100 to generate a circuit design, which is then implemented for the multi-die device 120. The circuit design system 100 implements different circuit design portions 124-1, 124-2, 124-3 of the circuit design (collectively circuit design portions 124) in different IC dies 122 in a manner that optimizes placement of the design to the multi-die device. In the example, the circuit design portion 124-1 is implemented using resources of the IC die 122-1, the circuit design portion 124-2 is implemented using resources of the IC die 122-2, and the circuit design portion 124-3 is implemented using resources of the IC die 122-3. As discussed below, the circuit design system 100 implements portions 124 of the circuit design using multiple child processes 104 corresponding to a die of the multi-die device. In the example, each child process 104 can generate a placement for a corresponding circuit design portion.

In some examples, each processor 102 having a child process 104 is coupled to an IC die 122 of the multi-die device 120. The parent process 103 generates the child processes 104 that can run on the processors 102. The number of generated child processes 104 can equal the number of dies of the multi-die device 120. In some examples, the parent process 103 can configure each child process 104 to perform placement for a corresponding IC die of the multi-die device 120. The parent process 103 can also perform placement for an IC die of the multi-die device 120. In some examples, the parent process 103 can assign a die to each child process 104 (or to itself if it is configured to perform placement for an IC die of the multi-die device 120).

In some examples, the computer 101 can be coupled to input/output (IO) devices and a display to allow a user to interact with computer 101. In some examples, the computer can include various support circuits and an IO interfaces to support the computer 101 and to allow interaction between the computer and a user. The support circuits can include conventional cache, power supplies, clock circuits, data registers, IO interfaces, and the like. The IO interface can be directly coupled to the memory 108 or coupled through the processors 102. The IO interface can be coupled to the IO devices, which can include conventional keyboard, mouse, and the like. The IO interface can also be coupled to the display, which can present a GUI to a user.

The memory 108 may store all or portions of one or more programs and/or data to implement aspects of the circuit design system 100 described herein. The memory 108 can store circuit design tool code 110 that is executable by the processors 102. In some examples, the memory 108 can store code for MPF 112 to implement MPF, which is described below. The memory 108 can include one or more of random access memory (RAM), read only memory (ROM), magnetic read/write memory, FLASH memory, solid state memory, or the like as well as combinations thereof.

In some examples the circuit design tool 110 can be configured to receive behavioral description of a circuit design for the multi-die device. The circuit design tool 110 processes the behavioral description to produce a logical description of the circuit design. The logical description includes a logical network list ("netlist") of lower-level circuit elements and logic gates, as well as connections (nets) between inputs and outputs thereof, in terms of the hierarchy specified in the behavioral description. For example, the logical description may be compliant with the Electronic Design Interchange Format (EDIF). The circuit design tool 110 may also generate constraint data associated with the logical description that includes various timing and layout constraints. Alternatively, the logical description may be annotated with constraint data. Such an annotated netlist is produced by XST synthesis tool, commercially available by Xilinx, Inc., of San Jose, Calif.

The circuit design tool 110 can pass the logical description of the circuit design to the MPF 112. Because the MPF 112 is configured to implement the circuit design to the multi-die device 120, the MPF 112 can include a map tool and a place-and-route tool. The map tool maps the logical description onto physical resources within the multi-die device (i.e., the circuit components, logic gates, and signals are mapped onto LUTs, flip-flops, clock buffers, I/O pads, and the like of the target FPGA). The map tool produces a mapped circuit description in accordance with any constraints in the constraint data. The mapped circuit description includes groupings of the physical resources of the multi-die device 120 expressed in terms of CLBs and IOBs that include these resources. In one embodiment, the mapped circuit description does not include physical location information. The PAR tool is configured to receive the mapped circuit description and the constraint data. The PAR tool determines placement for the physical resource groupings of the mapped circuit description in the multi-die device 120 and apportions the appropriate routing resources. The PAR tool performs such placement and routing in accordance with any constraints in the constraint data. The PAR tool produces physical design data.

In some examples, the MPF 112 can also include a bitstream generator. In some examples, the bitstream generator is configured to receive the physical design data and produce bitstream data for the multi-die device 120.

Figure 1B:
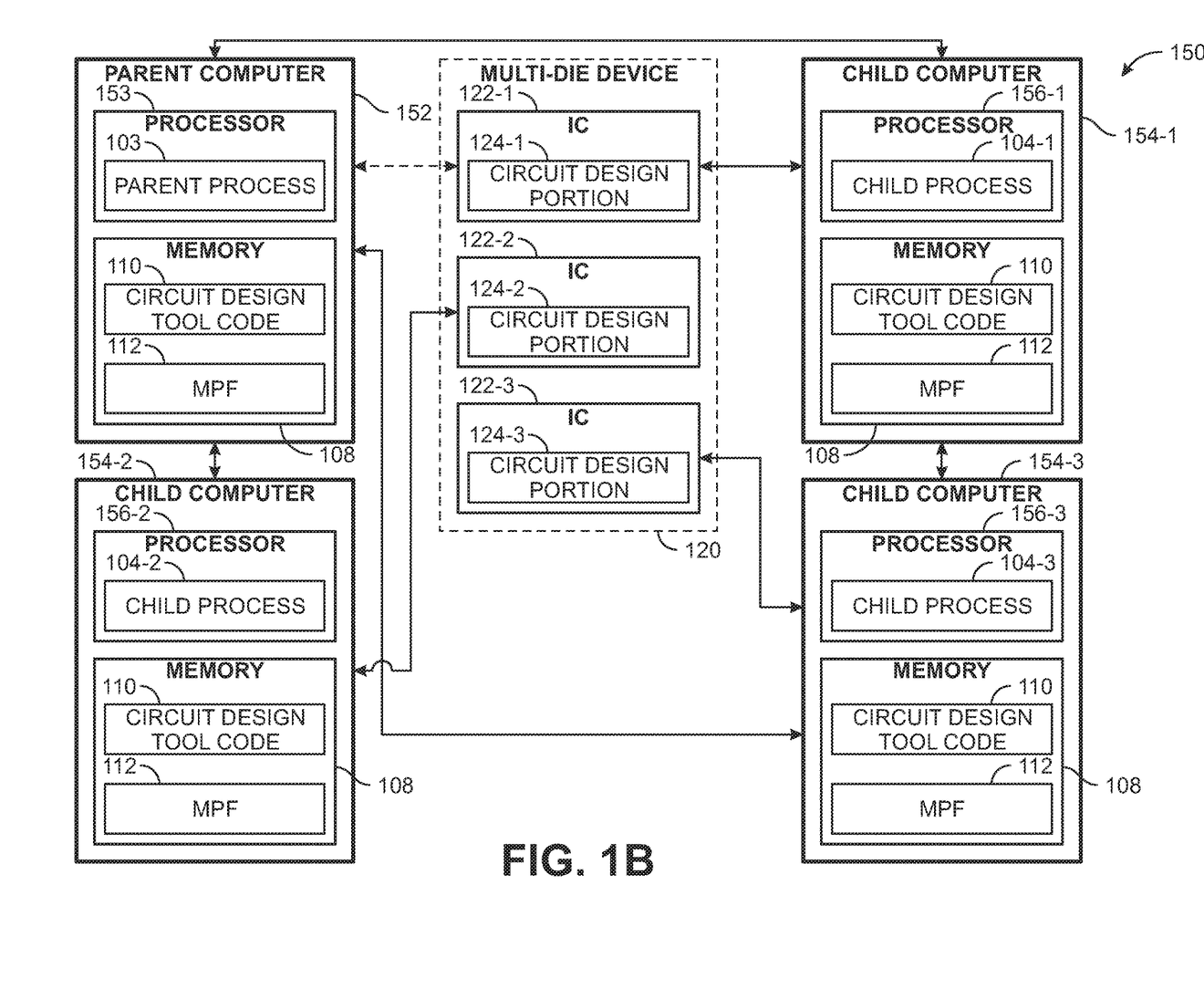
FIG. 1B depicts another example of a circuit design system using a multi-processing flow.

FIG. 1B illustrates an example of another circuit design system 150 using MPF. The circuit design system 150 includes multiple computers: parent computer 152 and child computers 154-1, 154-2, 154-3 (collectively child computers 154), and each computer has at least one processor. Processor 153 executes a parent process 103 on the parent computer 152 while the other three processors 156-1, 156-2, 156-3 (collectively processors 156) execute child processes 104 on the child computers 154. With each computer having at least one processor, multiple computers are coupled to the multi-die device 120. For example, each of the child computers 154 is coupled to a die of the multi-die device 120.

Each of the parent computer 152 and child computers 154 has memory 108 storing circuit design tool code 110 and code for MPF 112. The parent computer 152 can be configured with the parent process 103 similar to the parent processor 102 shown in FIG. 1A. For example, the processor 153 of the parent computer 152 is configured to perform operations of the parent process 103 similar to the processor 102 of the computer 101 of FIG. 1A. Accordingly, the parent process 103 uses processor 153 of the computer 152 to generate child processes 104 for the processors 156 of the child computers 154, and instruct them to perform placement operations for an IC die of the multi-die device 120. Similarly, the processors 156 of the child computers 154 are configured to perform operations of the child processes 104 similar to the processors 102-2, 102-3, 102-4 of the computer 101 of FIG. 1A. Accordingly, the processors 156 of the child computers 154 are configured to receive child processes 104 from the processor 153 of the parent computer 152, and to perform placement operations for an IC die of the multi-die device 120. For ease of reference, the parent computer 152 can perform any operations attributed to the processor 102-1 of FIG. 1A, and the child computers 154 can perform any operations attributed to the processors 102-2, 1024, 102-4 of FIG. 1A.

Because the processors 156 of the child computers 154 are disposed on different machines than the processor 153 for the parent computer 152, the parent computer 152 comprises components (not illustrated) that facilitate communication with the child computers 154. Similarly, the child computers 154 comprises components (not illustrated) that facilitate communication with the parent computer 152. Generally, FIGS. 1A and 1B represent two different computing systems that can be used to perform MPF. The child processes 104 are executed on different processors (or different cores in the same processor) which can be in the same computing system (as shown in FIG. 1A) or different computing systems (as shown in FIG. 1B). However, FIGS. 1A and 1B are non-limiting examples since MPF can be performed in any manner which permits the parent and child processes to execute in parallel.

Figure 2:
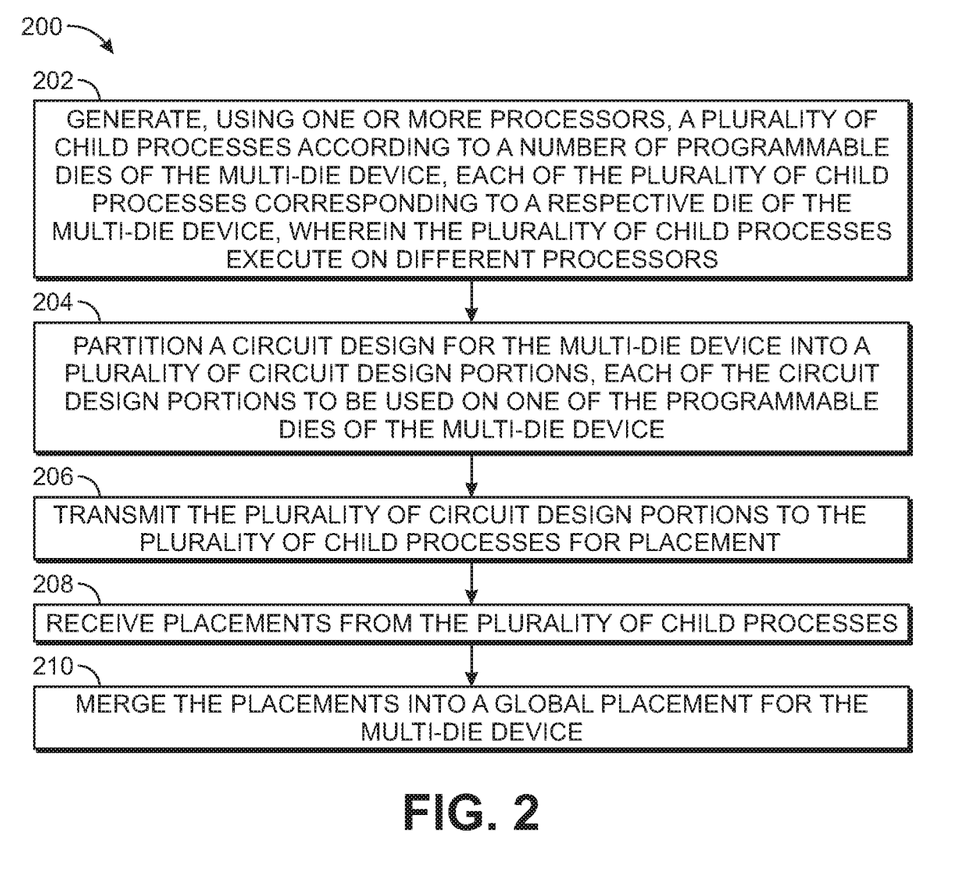
FIG. 2 is a flow diagram illustrating multi-processing flow for placing a circuit design on a multi-die device, according to an example.

FIG. 2 illustrates MPF for placing a design on a multi-die device 120 as shown in, e.g., FIGS. 1A and 1B. The computer 101, using one or more processors, can perform the operations 200 of MPF. In some examples, the operations 200 can be a parent process performed by a processor (e.g., processor 102-1 of FIG. 1A or the processor 153 in the parent computer 152 in FIG. 1B).

At 202, the parent process generates child processes according to a number of IC dies of the multi-die device 120. Each child process corresponds to a respective IC die of the multi-die device 120. For example, a first child process corresponds to IC die 122-1 of the multi-die device 120, a second child process corresponds to IC die 122-2 of the multi-die device 120, and so forth. In some examples, the child processes can correspond to a processor 102 of FIG. 1A. The parent process can also be configured with the operations of a child process, accordingly the parent processor 102 corresponds to an IC die of the multi-die device 120. For example, the parent processor 102 is coupled and corresponds to IC die 122-1 and so can operate on IC die 122-1. In such examples, the parent process generates fewer child processes to accommodate the parent process operating as a child process. In some examples, the parent process can generate any number of child processes depending on how many circuit design portions the user wants to use for placement of the circuit design.

At 204, the parent process partitions the circuit design for the multi-die device 120 into a plurality of circuit design portions 124. Each of the circuit design portions 124 of the circuit design can be used to configure one of the IC dies 122 of the multi-die device 120. When partitioning the circuit design, the parent process chooses nets to cut to accommodate die boundaries. The parent process can choose nets that are not likely to be critical nets, and the parent processor can optimize and legalize these cross-die connections. In some cases, during the partitioning of the circuit design at 204, the parent process performs an initial global mapping and placement to assist in the partitioning of the circuit design along the die boundaries. This initial global mapping and placement can map circuit design portions 124 to particular IC dies to avoid having critical nets mapped along inter-die connections and to place components next to each other to avoid penalty. The parent process can also consider clock region and clock routing constraints during partitioning.

At 206, the parent process transmits the plurality of circuit design portions 124 to the plurality of child processes for placement. For example, the parent process transmits the circuit design portion 124-1 to the child process 104-1, and the child process 104-1 performs placement operations for the circuit design portion 124-1 to IC die 122-1. Similarly, the parent process transmits the circuit design portion 124-2 to the child process 104-2 and the circuit design portion 124-3 to the child process 104-3. In some examples, the parent process 103 can act as a child process and keeps a circuit design portion (e.g., the circuit design portion 124-1) for placement operations.

Figure 3:
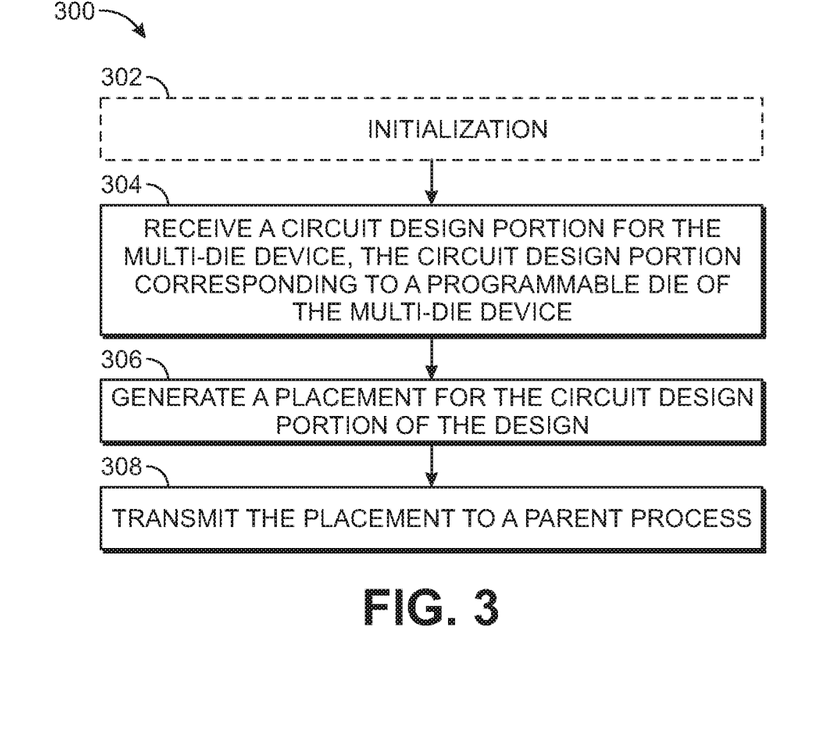
FIG. 3 is a flow diagram illustrating operations performed by a child process in a multi-processing flow, according to an example.

FIG. 3 is a flow diagram illustrating operations performed by a child process in MPF, according to an example. The computer 101, using one or more processors, can perform the operations 300 of MPF. In some examples, the operations 300 for a child process can be performed by a processor (e.g., processor 102 of FIG. 1A or a processor in the child computers 154 in FIG. 1B). Operations 200 can be performed by multiple child processes 104 in parallel, as discussed later with reference to FIG. 4.

At 302, in some examples, the child process can begin an initialization process, where the child process instantiates and prepares for the rest of the operations 200.

At 304, the child process receives a circuit design portion 124 for the multi-die device 120 from the parent process. As mentioned, the circuit design portion 124 corresponds to an IC die of the multi-die device 120.

At 306, the child process generates a placement of instances for the circuit design portion 124. When each child process generates a placement of instances, the child process generates a placement for its corresponding die. In some examples, placement of the circuit design portion 124 can include mapping components in the netlist and inputs and outputs to hardware of the corresponding die. In some examples, routing is performed, which can generate routes for streaming data between components of the dies. The routing, e.g., global and/or detailed routing, can include using a Boolean satisfiability problem (SAT) algorithm, an integer linear programming (ILP) algorithm, a PathFinder algorithm, a greedy algorithm, and/or the like.

At 308, the child process transmits the placement to a parent process operating on the parent process.

Returning to FIG. 2, at 208, the parent process receives the placements from the plurality of child processes. Upon receiving the placements from the plurality of child processes, the parent process can merge the placements for various IC dies of the multi-die device 120 so that the placements can function together on the multi-die device 120. In some examples, the parent process generates bitstream data from the merged placements via a bitstream generator.

FIG. 4 illustrates an example flow of a parent process and child processes in MPF, according to an example. The parent process 402 of FIG. 4 can be the operations 200 of FIG. 2, and the child processes 404-1, 404-2, 404-3 (collectively child processes 404) of FIG. 4 can be the operations 300 of FIG. 3.

As illustrated, the parent process 402 and the child processes 404 can operate in parallel. At 202, the parent process 402 generates the child processes 404 and then continues to operate in parallel with the generated child processes 404. For example, the parent process 402 generates three child processes 404-1, 404-2, 404-3 corresponding to three dies of the multi-die device 120.

At 204, the parent process 402 partitions a circuit design for the multi-die device 120 and transmits the circuit design portions (e.g., circuit design portions 124) to the child processes 404 for placement.

At 302-1, 302-2, 302-3, while the parent process 402 partitions a design for the multi-die device 120, the child processes 404 can perform initialization, in which each child process is assigned a die of the multi-die device 120. The child processes 404 can also prepare for the receipt of circuit design portions of the multi-die device 120.

Accordingly, when the parent process 402 transmits at 206, at 304-1, 304-2, 304-3, the child processes 404 correspondingly receive a circuit design portion corresponding to the die to which the child process is assigned.

At 306-1, 306-2, 306-3, each child process 404 generates a placement of instances for its corresponding die. The placement generated can be based on the circuit design portion 124 transmitted from the parent process 402.

At 308-1, 308-2, 308-3, each child process 404 transmits the placement to the parent process 402.

In some examples, at 207, while the child processes 404 generate a placement for the circuit design portion of the corresponding die, the parent process 402 can manage the child processes 404-1, 404-2, 404-3. In some examples, the parent process 402 can be configured to operate as a child process and can also generate a placement of instances for a die of the multi-die device 120.

At 208, the parent process 402 receives the placements from the various child processes 404, and at 210, merges all the placements into a global placement for the multi-die device 120.

FIG. 5A graphically illustrates an example floorplan generated during partitioning 204 of FIG. 2. The floorplan 510 comprises netlist components 502 and inputs and/or outputs (IOs) 504 to the netlist components 502. In some examples, the parent process 103 can perform an initial floorplanning of the multi-die device 120 by partitioning the circuit design. For example, the parent process 103 can partition the netlist components 502 and IOs 503 into circuit design portions for the various dies of the multi-die device 120. The portions 124 can include any number of netlist components 502 and any number of IOs 504. In some examples, the circuit design portions 124 can include nets for edges between dies, netlist components 502, and/or IOs 504.

In some examples, the parent process 103 can perform a first iteration of placement of the circuit design for the multi-die device 120 to generate resource usage information ("planned resource usage"). The planned resource usage can include, for example, a general floorplan for each IC die in the multi-die device 120. Each general floorplan includes the resources to be used by a circuit design portion (e.g., logic resources, routing resources, etc.). The parent process 103 can also generate floorplan constraints for each IC die of the multi-die device 120.

In some examples, during the initial placement for the multi-die device 120, the parent process 103 generates a graph of the floorplan 510 with nodes and weighted edges. Each node is either a netlist component 502 having any number of netlist subcomponent 506 or an IO 504, and occupies a site on a die of the multi-die device 120. Each edge represents a connection between the netlist components 502 or a connection between the netlist components 502 and IOs 504. Some netlist components 502 and some IOs 504 have requirements or constraints for placement and routing. Accordingly, edges between those netlist components 502 and those IO 504 are weighted differently.

Once the parent process 103 has performed an initial placement of netlist components 502 and IOs 504, the parent process 103 partitions the floorplan 510. In some examples, the parent process 103 finds a cut that minimizes the edges that will be cut, while satisfying utilization requirements between the circuit design portions. By the end of partitioning, every netlist component 502 and IO 504 is assigned to a circuit design portion.

For example, as illustrated in FIG. 5A, the parent process 103 partitions the circuit design for a device having four dies. Portion A is a portion of the circuit design corresponding to a first die, Portion B is a portion of the circuit design corresponding to a second die, and so forth. Each of the portions of the circuit design comprises a portion of the netlist, and so the portions can comprise netlist components 502 and IOs 504. In some cases, the partition between portions falls on an edge of the graph. For example, the partition between portions for Die A and Die B falls on an edge between an input/output and one of the component instances.

FIG. 5B graphically illustrates example placement of the partitioned circuit design portions of FIG. 5A. After partitioning the circuit design into portions for each die of the multi-die device 120, the parent process 103, as a part of MPF, provides for placement of the circuit design portions 124 onto a corresponding die. As illustrated, Portion A is given to a child process running on processor 514-1, and the child process maps Portion A to its corresponding die. Portion B is given to a child process running on processor 514-2, and the child process maps Portion B to its corresponding die. Portion C is given to a child process running on processor 514-3, and the child process maps Portion C to its corresponding die. Portion D is given to a child process running on processor 514, and the child process maps Portion D to its corresponding die.

In some cases, as mentioned, the parent process 103 cuts the circuit design along a net or an edge passing between two circuit design portions. In such cases, the circuit design portions each comprise information regarding this net. For example, in FIG. 5A, an IO node 504 is connected via two edges to netlist components of Portion B and to netlist components of Portion A. The partition cut between Portion A and Portion B cuts through the edge from the IO node to the netlist components of Portion A. To accommodate for such partition cuts, the parent process 103 includes a copy of the IO node in both Portion A and Portion B when the parent process 103 transmits the circuit design portions to the respective child processes. As illustrated in FIG. 5B, the IO node is connected to the netlist components of Portion A when the child process running on processor 514-1 receives Portion A. Similarly, IO node is connected to the netlist components of Portion B when the child process running on processor 514-2 receives Portion B. Other techniques for handling partition cuts can also be used for partitioning a circuit design for a multi-die device.

FIG. 6 depicts an example of a circuit design system using MMT flow. The circuit design system 600 includes a computer 601 coupled a multi-die device 120. The computer 601 includes a processor 602, and a memory 108. In some examples, the processor 602 can include one or more microprocessors.

Like with the circuit design system 100 using MPF, a user interacts with the circuit design system 600 to generate a circuit design, which is then implemented for the multi-die device 120. The circuit design system 600 implements different circuit design portions 124 of the circuit design in different IC dies 122 in a manner that optimizes placement of the design to the multi-die device 120. The circuit design system 600 uses massively multi-threaded flow to generate placements for circuit design portions. Accordingly, the processor includes thread pools 604-1, 604-2, 604-3 (collectively "thread pools 604"), each corresponding to a different IC die of the multi-die device 120. In some examples, the thread pools 604 can have any number of threads, and the thread pools 604 can be configured to perform placement operations for the multi-die device 120. The circuit design system 600 also generates contexts for the thread pools 604 (e.g., ActiveContext 804-1, 804-2, 804-3 (collectively "contexts 804") in FIG. 8) by isolating databases for each die.

In MMT, the thread pools 604 and contexts 804 are independent of other thread pools and contexts. Because of this independence, MMT does not require mutexes and thus does not suffer from lack of scaling found in other multithreading flows. In some examples, the contexts 804 comprises replicated data common to the context 804 for each die of the multi-die device 120. The contexts can include information associated with components of the circuit design for the multi-die device, and the information of each context is associated with the respective die. The contexts allow the processor 602 to perform placement operations for a die of the multi-die device 120 using information and data structures local to the die without affecting information and data structures of other dies. The use of a massive number of threads improves runtime with improved thread scaling.

FIG. 7 is a flow diagram illustrating massively multi-threaded (MMT) flow using circuit design system 600 of FIG. 6 for placement. In some examples, the flow of FIG. 7 comprises operations 700 performed by a processor (e.g., processor 602 of FIG. 6) of a computer.

At 702, the processor 602 partitions a circuit design for the multi-die device 120 into one or more circuit design portions 124. Each of the circuit design portions 124 partitioned can be placed on one of the dies of the multi-die device 120. In some examples, the processor 602 can partition the circuit design for MMT using the partitioning techniques described for MPF. In some examples, the processor 602 can perform an initial placement of the circuit design to place critical paths in order to avoid placing critical paths along the crossings between the programmable dies At 704, the processor 602 generates thread pools 604 according to a number of dies of the multi-die device 120. Each of the thread pools 604 corresponds to a die of the multi-die device 120. In some examples, dies can have more than one circuit design portion, and so more than one thread pool can correspond to an IC die.

At 706, the processor 602 generates a context for each of the dies of the multi-die device 120. In some examples, the context is generated by isolating one or more data structures of each die.

At 708, the processor 602 generates a placement for each die of the multi-die device 120 with the context using a respective thread pool of the plurality of thread pools 604. In some examples, the processor 602 instructs the thread pools 604 to synchronize the contexts to help preserve QoR. By synchronizing the contexts, the processor has more global information about the dies of the multi-die device 120. With the synchronized contexts, the processor can determine whether nets crossing die boundaries still meet constraints. In some examples, after synchronization, the context of each die comprises the same information At 710, the processor 602 can merge the placements into a global placement for the multi-die device 120. The processor 602 can merge the placements in a way similar to how the parent processor 102 merges the placements for MPF in FIG. 2. In some examples, the processor 602 merges the contexts for each die and each thread pool 604 into a global context for the multi-die device 120. Like with a context of a single die of the multi-die device, the global context includes the information associated with placement of components of the circuit design for each programmable die of the multi-die device. In some examples, when the processor 602 merges the contexts into a global context, the processor 602 assembles together information of the context of each die into the global context.

FIG. 8 graphically illustrates an example flow 800 of operations 700 of FIG. 7 for MMT flow, according to an example.

At 802, the processor 602 can initialize the plurality of thread pools. As mentioned, the processor 602 initializes as many thread pools 604 as there are dies in the multi-die device 120, and each thread pool 604 corresponds to a die of the multi-die device 120. Each thread pool 604 can have any number of threads to perform placement operations. In some examples, the processor 602 also generates a context 804 (e.g., ActiveContext 804-1, 804-2, 804-3) for each thread pool 604. The context 804 comprises a plurality of databases for the corresponding die of the multi-die device 120.

After initialization 802, at 702, the processor 602 partitions the circuit design for the multi-die device 120 into circuit design portions 124. The circuit design portions 124 are then transmitted (as illustrated) to each thread pool 604. For example, three circuit design portions 124 are transmitted to three thread pools 604. As mentioned, each of the thread pools 604 has a corresponding context 804 comprising data structures isolated to the corresponding die. At 708-1, 708-2, 708-3, each thread pool 604 can perform placement operations for a respective IC die using the context 804 having isolated data structures. In some examples, the thread pools 604 synchronize the contexts 804. At 710, the parent processor takes the placements generated from each thread pool 604 and merges them into a global placement for the multi-die device 120.

Figure 9:
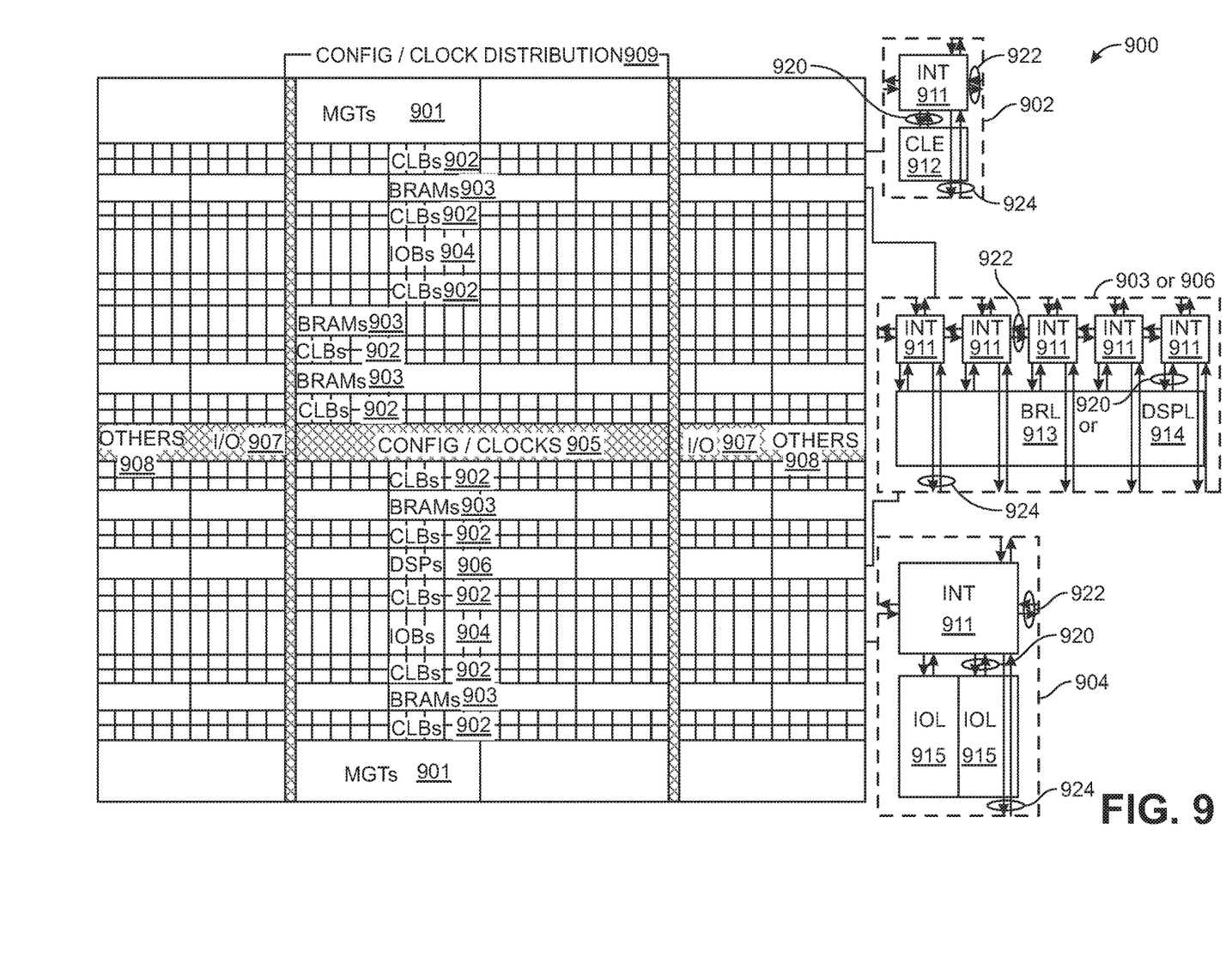
FIG. 9 illustrates an example of a field programmable gate array (FPGA) that can be used in a multi-die device.

FIG. 9 illustrates an example of an FPGA 900. The FPGA 900 can be used as an IC die in the multi-die device 120. The FPGA 900 includes a programmable fabric that includes a large number of different programmable tiles including multi-gigabit transceivers ("MGTs") 901, configurable logic blocks ("CLBs") 902, random access memory blocks ("BRAMs") 903, input/output blocks ("IOBs") 904, configuration and clocking logic ("CONFIG/CLOCKS") 905, digital signal processing blocks ("DSPs") 906, specialized input/output blocks ("VO") 907 (e.g., configuration ports and clock ports), and other programmable logic 908 such as digital clock managers, analog-to-digital converters, system monitoring logic, and so forth. Some FPGAs also include dedicated processor blocks ("PROC") 910.

In some FPGAs, each programmable tile can include at least one programmable interconnect element ("INT") 911 having connections to input and output terminals 920 of a programmable logic element within the same tile. Each programmable interconnect element 911 can also include connections to interconnect segments 922 of adjacent programmable interconnect element(s) in the same tile or other tile(s). Each programmable interconnect element 911 can also include connections to interconnect segments 924 of general routing resources between logic blocks (not shown). The general routing resources can include routing channels between logic blocks (not shown) comprising tracks of interconnect segments (e.g., interconnect segments 924) and switch blocks (not shown) for connecting interconnect segments. The interconnect segments of the general routing resources (e.g., interconnect segments 924) can span one or more logic blocks. The programmable interconnect elements 911 taken together with the general routing resources implement a programmable interconnect structure ("programmable interconnect") for the illustrated FPGA. Each programmable interconnect element 911 can include an interconnect circuit that can implement various types of switching among input interconnect segments and output interconnect segments, such as cross-point switching, breakpoint switching, multiplexed switching, and the like.

In an example, a CLB 902 can include a configurable logic element ("CLE") 912 that can be programmed to implement user logic plus a single programmable interconnect element ("INT") 911. A BRAM 903 can include a BRAM logic element ("BRL") 913 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 906 can include a DSP logic element ("DSPL") 914 in addition to an appropriate number of programmable interconnect elements. An IOB 904 can include, for example, two instances of an input/output logic element ("IOL") 915 in addition to one instance of the programmable interconnect element 911. As will be clear to those of skill in the art, the actual VO pads connected, for example, to the 1/O logic element 915 typically are not confined to the area of the input/output logic element 915.

In the pictured example, a horizontal area near the center of the die is used for configuration, clock, and other control logic. Vertical columns 909 extending from this horizontal area or column are used to distribute the clocks and configuration signals across the breadth of the FPGA.

Some FPGAs utilizing the architecture illustrated in FIG. 9 include additional logic blocks that disrupt the regular columnar structure making up a large part of the FPGA. The additional logic blocks can be programmable blocks and/or dedicated logic. For example, processor block 910 spans several columns of CLBs and BRAMs. The processor block 910 can comprise various components ranging from a single microprocessor to a complete programmable processing system of microprocessor(s), memory controllers, peripherals, and the like.

Note that FIG. 9 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 9 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA. Moreover, the FPGA of FIG. 9 illustrates one example of a programmable IC that can employ examples of the interconnect circuits described herein. The interconnect circuits described herein can be used in other types of programmable ICs, such as complex programmable logic devices (CPLDs) or any type of programmable IC having a programmable interconnect structure for selectively coupling logic elements.

The various examples described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more examples may be implemented as useful machine operations. In addition, one or more examples also relate to a device or an apparatus for performing these operations. The apparatus may be specially constructed for specific purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various examples described herein may be practiced with other computer system configurations including handheld devices, microprocessor systems, microprocessor-based or programmable consumer electronics, minicomputers, mainframe computers, and the like.

One or more examples may be implemented as one or more computer programs or as one or more computer program modules embodied in one or more computer readable media. The term computer readable medium refers to any data storage device that can store data which can thereafter be input to a computer system. A computer readable media may be based on any existing or subsequently developed technology for embodying computer programs in a manner that enables them to be read by a computer. Examples of a computer readable medium (e.g., a non-transitory storage medium) include a hard drive, a Solid State Disk (SSD), network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

While the foregoing is directed to specific examples, other and further examples may be devised without departing from the basic scope thereof, and the scope thereof is determined by the claims that follow.

What is claimed is:

1. A non-transitory computer-readable medium storing instructions, which when executed by one or more processors, cause the one or more processors to perform operations, the operations comprising:
   generating, using the one or more processors, a plurality of child processes according to a number of dies of a multi-die device, each of the plurality of child processes corresponding to a respective one of the dies of the multi-die device, wherein the plurality of child processes execute on different processors;
   partitioning a circuit design for the multi-die device into a plurality of circuit design portions, each of the circuit design portions to be used to configure a respective one of the dies of the multi-die device;
   transmitting the plurality of circuit design portions to the plurality of child processes for placement;
   receiving a plurality of placements from the plurality of child processes; and
   merging the plurality of placements into a global placement for the multi-die device by merging information associated with placement of components of the circuit design for each of the dies of the multi-die device into the global placement.

2. The non-transitory computer-readable medium of claim 1, wherein the operations further comprise:
   receiving a configuration of the multi-die device, the configuration comprising the number of dies and constraints.

3. The non-transitory computer-readable medium of claim 1, wherein partitioning the circuit design comprises:
   identifying critical nets which are nets that have not met their timing constraint;
   identifying crossings between the dies of the multi-die device; and performing an initial placement of the circuit design to place critical paths, wherein the one or more processors avoid placing the critical paths along the crossings between the dies.

4. The non-transitory computer-readable medium of claim 1, wherein partitioning the circuit design comprises assigning a subset of a netlist to each of the dies of the multi-die device.

5. The non-transitory computer-readable medium of claim 1, wherein partitioning the circuit design comprises placing nets crossing boundaries between the dies of the multi-die device.

6. The non-transitory computer-readable medium of claim 1, wherein partitioning the circuit design comprises partitioning the circuit design along boundaries between the dies of the multi-die device.

7. The non-transitory computer-readable medium of claim 1, wherein the operations further comprise:
generating a placement of instances for a portion of the design, wherein the one or more processors correspond to a die of the multi-die device.

8. The non-transitory computer-readable medium of claim 1, wherein each of the plurality of child processes is configured to:
receive a circuit design portion for the multi-die device, the circuit design portion corresponding to a die of the multi-die device;
generate a placement for the circuit design portion; and
transmit the placement to a parent process.

9. A non-transitory computer-readable medium storing instructions, which when executed by one or more processors, cause the one or more processors to perform operations, the operations comprising:
partitioning a circuit design for a multi-die device into a plurality of circuit design portions, each of the plurality of circuit design portions to be placed on a respective die of the multi-die device;
generating a plurality of thread pools according to a number of dies of the multi-die device, each of the plurality of thread pools corresponding to a die of the multi-die device;
generating a context for each of the dies of the multi-die device by isolating a plurality of data structures of each die, the context having the isolated data structures; and
generating a placement for each die of the multi-die device with the context using a respective thread pool of the plurality of thread pools.

10. The non-transitory computer-readable medium of claim 9, wherein a first context for a first die is independent from a second context for a second die.

11. The non-transitory computer-readable medium of claim 9, wherein the operations further comprise:
synchronizing the contexts of the dies with each other for generating the placement of each die, wherein after the synchronization, the context of each die comprises the same information.

12. The non-transitory computer-readable medium of claim 9, wherein the isolated data structures of the context comprise information associated with components of the circuit design for the multi-die device, and wherein information of each context is associated with the respective die.

13. The non-transitory computer-readable medium of claim 9, wherein the operations further comprise:
merging the context of each die into a global context by assembling together information of the context of each die into the global context, wherein the global context comprises information associated with placement of components of the circuit design for each die of the multi-die device.

14. The non-transitory computer-readable medium of claim 9, wherein partitioning the circuit design comprises:
identifying critical nets;
identifying crossings between the dies of the multi-die device; and
performing an initial placement of the circuit design to place the critical nets, wherein the one or more processors avoid placing the critical nets along the crossings between the dies.

15. The non-transitory computer-readable medium of claim 9, wherein partitioning the circuit design comprises assigning a subset of a netlist to each die of the multi-die device.

16. The non-transitory computer-readable medium of claim 9, wherein partitioning the circuit design comprises placing nets crossing boundaries between the dies of the multi-die device.

17. The non-transitory computer-readable medium of claim 9, wherein partitioning the circuit design comprises partitioning the circuit design along boundaries between the dies of the multi-die device.

18. The non-transitory computer-readable medium of claim 9, wherein the operations further comprise:
receiving a configuration of the multi-die device, the configuration comprising the number of dies and constraints.

19. A method for configuring a multi-die device comprising a plurality of dies, the method comprising:
generating, using one or more processors, a plurality of child processes according to a number of the dies of the multi-die device, each of the plurality of child processes corresponding to a respective one of the dies of the multi-die device, wherein the plurality of child processes execute on different processors;
partitioning a circuit design for the multi-die device into a plurality of circuit design portions, each of the circuit design portions to be used to configure a respective one of the dies of the multi-die device;
transmitting the plurality of circuit design portions to the plurality of child processes for placement;
receiving placements from the plurality of child processes;
receiving a plurality of placements from the plurality of child processes; and
merging the plurality of placements into a global placement for the multi-die device by merging information associated with placement of components of the circuit design for each of the dies of the multi-die device into the global placement.

20. The non-transitory computer-readable medium of claim 1, wherein performing an initial placement of the circuit design comprises generating a graph of a floorplan with nodes and weighted edges between the nodes, the nodes representing netlist components and inputs/outputs.

\* \* \* \* \*